(12) United States Patent
Wang et al.

(10) Patent No.: US 10,938,502 B2
(45) Date of Patent: Mar. 2, 2021

(54) METHOD AND SYSTEM FOR ACCURATE IPG COMPENSATION OF USXGMII MULTI-CHANNEL

(71) Applicant: CENTEC NETWORKS (SU ZHOU) CO., LTD., Suzhou (CN)

(72) Inventors: Dong Wang, Suzhou (CN); Wei He, Suzhou (CN); Chunjian Yuan, Suzhou (CN)

(73) Assignee: CENTEC NETWORKS (SU ZHOU) CO., LTD., Jiangsu (CN)

( * ) Notice: Subject to any disclaimer, the term of this patent is extended or adjusted under 35 U.S.C. 154(b) by 169 days.

(21) Appl. No.: 16/348,114

(22) PCT Filed: Feb. 15, 2017

(86) PCT No.: PCT/CN2017/073647
§ 371 (c)(1),
(2) Date: May 7, 2019

(87) PCT Pub. No.: WO2018/086266
PCT Pub. Date: May 17, 2018

(65) Prior Publication Data
US 2019/0260494 A1 Aug. 22, 2019

(30) Foreign Application Priority Data
Nov. 11, 2016 (CN) .......................... 201610996979.1

(51) Int. Cl.
*H04L 1/00* (2006.01)
*H04L 27/26* (2006.01)
(52) U.S. Cl.
CPC .......... *H04L 1/0002* (2013.01); *H04L 1/0015* (2013.01); *H04L 27/2666* (2013.01)
(58) Field of Classification Search
CPC .. H04L 1/0002; H04L 1/0015; H04L 27/2666
See application file for complete search history.

(56) References Cited

U.S. PATENT DOCUMENTS 8,385,374 B1 * 2/2013 Wohlgemuth .......... H04L 25/14
370/509
9,544,237 B1 * 1/2017 Lo ........................... H04L 47/22
(Continued)

FOREIGN PATENT DOCUMENTS

CN 101345613 A 1/2009
CN 103916217 A 7/2014
(Continued)

OTHER PUBLICATIONS

International Search Report for PCT/CN2017/073647 dated Jun. 5, 2017 and its English translation provided by WIPO.
(Continued)

*Primary Examiner* — Habte Mered
*Assistant Examiner* — Nevena Zecevic Sandhu
(74) *Attorney, Agent, or Firm* — Ladas & Parry, LLP

(57) ABSTRACT

The present invention provides a method and system for accurate IPG compensation of USXGMII multi-channel. The method comprises acquiring the length of a correspondingly deleted IPG unit between the inserted two sets of AM corresponding to each logical channel according to the working rate of a physical link, the number of distributed logical channels, the effective transmission rate corresponding to each logical channel, and the length of a set of AM inserted into each logical channel; and acquiring the data deletion interval corresponding to each logical channel, and the length of the IPG data to be deleted between the data deletion intervals according to the length of the correspondingly deleted IPG unit of each logical channel and the number of the inserted AM. The data transmission rate is enabled to be precisely matched with the bearing rate of the logical channel, thereby meeting the performance requirements.

14 Claims, 2 Drawing Sheets

(56) References Cited

U.S. PATENT DOCUMENTS

2012/0236878 A1\* 9/2012 Shafai ................... H04L 47/22
                                                          370/474
2016/0182175 A1 6/2016 Landau et al.

FOREIGN PATENT DOCUMENTS

| CN | 105897631 A | 8/2016 |
| WO | 2016099717 A1 | 6/2016 |

OTHER PUBLICATIONS

Written Opinion of the International Searching Authority for PCT/CN2017/073647 dated Jun. 5, 2017 and its English translation provided by Google Translate.

\* cited by examiner

METHOD AND SYSTEM FOR ACCURATE IPG COMPENSATION OF USXGMII MULTI-CHANNEL

CROSS-REFERENCE TO RELATED APPLICATIONS

The present application is the U.S. national phase of PCT/CN2017/073647 filed on Feb. 15, 2017, which claims the priority to the Chinese Patent Application No. 201610996979.1 titled "Method and System for Accurate IPG Compensation of USXGMII Multi-channel" and submitted on Nov. 11, 2016, the disclosures of which are incorporated herein by reference in their entireties.

TECHNICAL FIELD

The present invention relates to the field of network communication, and in particular to a method and system for accurate IPG compensation of USXGMII multi-channel.

BACKGROUND

USXGMII is a universal serial XG interface protocol standard of the industry defined by CISCO. The protocol standard is divided into two modes: Single and Multiport. The USXGMII-Multiport standard definition only has one physical link, the rate of which may be 5.15625 Gbps, 10.3125 Gbps, 20.625 Gbps, etc. Each physical link has multiple logical links, and the rate corresponding to each logical link is different according to the working rate of the physical link, and can be changed correspondingly, for example, 10G/5G/2.5G/1G/100M/10 Mbps. Each logical link is completely independent, and is in accordance with the 10GBASE-R and XGMII protocol standards defined by IEEE802.3. In the USXGMII-Multiport mode, in the transmitting direction of a PCS, the Alignment Marker (AM) needs to be inserted at a fixed interval. In the receiving side, the PCS synchronizes and recovers the data according to the AM, and distributes the data received from single physical link to different channels. Due to the insertion of the AM, the data bandwidth is additionally increased, but the bandwidth of the physical link is kept unchanged. In the prior art, in order to achieve the balance of the bandwidth, in the data transmission process, the data on each logical link is randomly deleted to match the rate. However, such a deletion mode causes data loss and affects the system performances.

SUMMARY

Objects of the present invention are to provide a method and system for accurate inter-packet-gap (IPG) compensation of USXGMII multi-channel.

In order to achieve one of the above objects, one embodiment of the present invention provides a method for accurate IPG compensation of USXGMII multi-channel, which comprises: acquiring the working rate of a physical link, the number of logical channels distributed corresponding to one physical link, and the effective transmission rate corresponding to each logical channel; monitoring the number of inserted AM corresponding to each logical channel, and monitoring the total length of the AM inserted into the physical link at a fixed interval in real time during the data transmission process; acquiring the length of a set of AM inserted corresponding to each logical channel according to the total length of the inserted AM; acquiring the length of a correspondingly deleted IPG unit between the inserted two sets of AM corresponding to each logical channel according to the working rate of the physical link, the number of the distributed logical channels, the effective transmission rate corresponding to each logical channel, and the length of a set of AM inserted into each logical channel; and acquiring the data deletion interval corresponding to each logical channel, and the length of the IPG data to be deleted between the data deletion intervals according to the length of the correspondingly deleted IPG unit and the number of the inserted AM.

As an improvement on one embodiment of the present invention, "monitoring the number of inserted AM corresponding to each logical channel in real time during the data transmission process" specifically comprises: allocating an AM insertion quantity register for each logical channel respectively; monitoring an AM valid signal flag bit corresponding to each logical channel in real time; incrementing the value of the corresponding insertion quantity register by one when the AM valid signal flag bit of the current logical channel indicates enabled; and clearing the value of the data insertion quantity register corresponding to the current logical channel when the value of the current insertion quantity register is equal to the data deletion interval of the corresponding logical channel.

As a further improvement on one embodiment of the present invention, "monitoring the total length of the AM inserted into the physical link at a fixed interval in real time during the data transmission process, and acquiring the length of a set of AM inserted corresponding to each logical channel according to the total length of the inserted AM" specifically comprises that the length of a set of AM inserted into each logical channel is equal to the total length of the AM inserted into the physical link at a fixed interval/the number of the logical channels distributed corresponding to one physical link.

As a further improvement on one embodiment of the present invention, "acquiring the length of a correspondingly deleted IPG unit between the inserted two sets of AM corresponding to each logical channel according to the working rate of the physical link, the number of the distributed logical channels, the effective transmission rate corresponding to each logical channel, and the length of a set of AM inserted into each logical channel" specifically comprises: acquiring the bearing rate corresponding to each logical channel according to the working rate of the physical link and the number of the distributed logical channels; wherein the bearing rate corresponding to each logical channel is equal to the working rate of the physical link/the number of the logical channels distributed corresponding to one physical link; and acquiring the length of the correspondingly deleted IPG unit when a set of AM is inserted corresponding to each logical channel according to the effective transmission rate and the bearing rate corresponding to each logic channel, and the length of a set of AM inserted into each logical channel; wherein the length of the correspondingly deleted IPG unit when a set of AM is inserted corresponding to each logical channel is equal to the length of a set of AM inserted into each logical channel/(the bearing rate corresponding to each logical channel/the effective transmission rate corresponding to each logical channel).

As a further improvement on one embodiment of the present invention, "acquiring the data deletion interval corresponding to each logical channel, and the length of the IPG data to be deleted between the data deletion intervals according to the length of the correspondingly deleted IPG unit of each logical channel and the number of the inserted AM" specifically comprises: judging whether the length of the IPG unit corresponding to the current logical channel is an integer, if so, using the length of the IPG unit as the length of the IPG data to be deleted corresponding to the current logical channel, and confirming the data deletion interval as 2 AM valid signals; and if not, rounding the length of the IPG unit to $2^n$, using the rounded result as the length of the IPG data to be deleted corresponding to the current logical channel, and confirming the data deletion interval as X AM valid signals, wherein $X=2^n$/the length of the IPG unit.

In order to achieve one of the above objects, an embodiment of the present invention provides a system for accurate IPG compensation of USXGMII multi-channel, wherein the system comprises: a data acquiring module, configured to acquire the working rate of a physical link, the number of logical channels distributed corresponding to one physical link, and the effective transmission rate corresponding to each logical channel; and monitor the number of inserted AM corresponding to each logical channel, and monitor the total length of the AM inserted into the physical link at a fixed interval in real time during the data transmission process; and a data processing module, configured to acquire the length of a set of AM inserted corresponding to each logical channel according to the total length of the inserted AM; acquire the length of a correspondingly deleted IPG unit between the inserted two sets of AM corresponding to each logical channel according to the working rate of the physical link, the number of the distributed logical channels, the effective transmission rate corresponding to each logical channel, and the length of a set of AM inserted into each logical channel; and acquire the data deletion interval corresponding to each logical channel, and the length of the IPG data to be deleted between the data deletion intervals according to the length of the correspondingly deleted IPG unit of each logical channel and the number of the inserted AM.

As an improvement on one embodiment of the present invention, the system further comprises a data storage module, wherein the data storage module comprises: an AM insertion quantity register allocated for each logical channel respectively.

The data processing module is further configured to monitor an AM valid signal flag bit corresponding to each logical channel in real time; increment the value of the corresponding insertion quantity register by one when the AM valid signal flag bit of the current logic channel indicates enabled; and clear the value of the data insertion quantity register corresponding to the current logical channel when the value of the current insertion quantity register is equal to the data deletion interval of the corresponding logical channel.

As a further improvement on one embodiment of the present invention, the data processing module is specifically configured such that the length of a set of AM inserted into each logical channel is equal to the total length of the AM inserted into the physical link at a fixed interval/the number of the logical channels distributed corresponding to one physical link.

As a further improvement on one embodiment of the present invention, the data processing module is specifically configured to acquire the bearing rate corresponding to each logical channel according to the working rate of the physical link and the number of the distributed logical channels; wherein the bearing rate corresponding to each logical channel is equal to the working rate of the physical link/the number of the logical channels distributed corresponding to one physical link; and acquire the length of the correspondingly deleted IPG unit when a set of AM is inserted corresponding to each logical channel according to the effective transmission rate and the bearing rate corresponding to each logic channel, and the length of a set of AM inserted into each logical channel: wherein the length of the correspondingly deleted IPG unit when a set of AM is inserted corresponding to each logical channel is equal to the length of a set of AM inserted into each logical channel/(the bearing rate corresponding to each logical channel/the effective transmission rate corresponding to each logical channel).

As a further improvement on one embodiment of the present invention, the data processing module is specifically configured to judge whether the length of the IPG unit corresponding to the current logical channel is an integer, if so, use the length of the IPG unit as the length of the IPG data to be deleted corresponding to the current logical channel, and confirm the data deletion interval as 2 AM valid signals; and if not, round the length of the IPG unit to $2^n$, use the rounded result as the length of the IPG data to be deleted corresponding to the current logical channel, and confirm the data deletion interval as X AM valid signals, wherein $X=2^n$/the length of the IPG unit.

Compared with the prior art, the present invention has the beneficial effects: according to the method and system for accurate IPG compensation of USXGMII multi-channel, according to the working rate of each logical channel, and the length of the inserted AM, the data deletion interval corresponding to the current logical channel and the length of the IPG data to be deleted are matched and acquired adaptively. Further, the data transmission rate is enabled to be precisely matched with the bearing rate of the logical channel, thereby meeting the performance requirements of the system, and improving the stability and reliability of a network chip.

DETAILED DESCRIPTION

Figure 1:
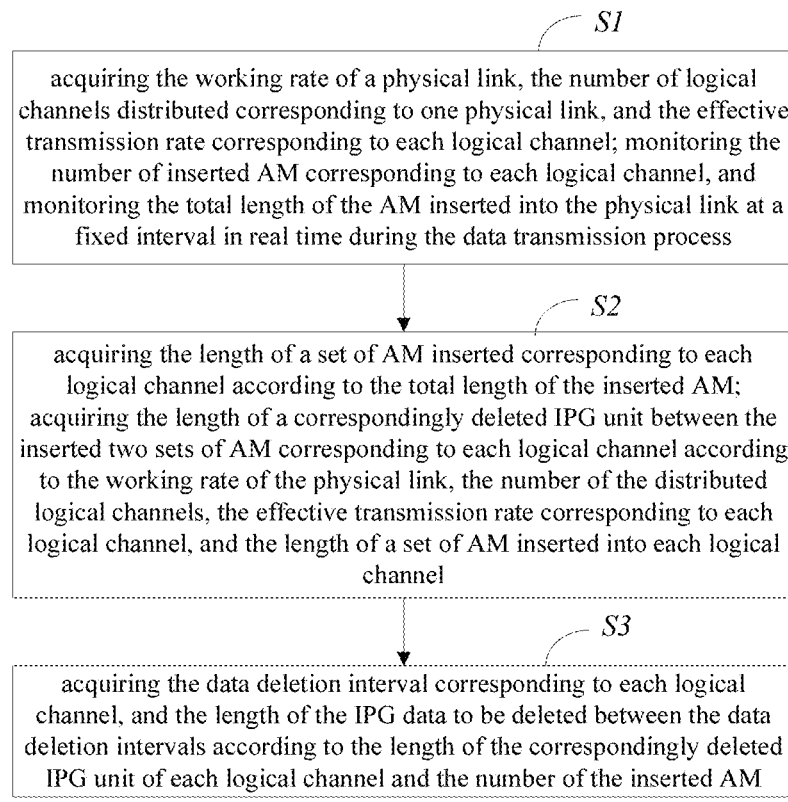
FIG. 1 is a schematic flowchart of a method for accurate IPG compensation of USXGMII multi-channel in one embodiment of the present invention.

The present invention will be described in detail in conjunction with specific embodiments shown in the drawings. However, the present invention is not limited to these embodiments, the transformations made by those ordinary skilled in the art on the structures, methods or functions according to these embodiments are all contained in the scope of the present invention.

As shown in FIG. 1, in one embodiment of the present invention, a method for accurate IPG compensation of USXGMII multi-channel comprises the following step.

S1: the working rate of a physical link, the number of logical channels distributed corresponding to one physical link, and the effective transmission rate corresponding to each logical channel are acquired.

The number of inserted AM corresponding to each logical channel, and the total length of the AM inserted into the physical link at a fixed interval are monitored in real time during the data transmission process.

Further, the method further comprises the following step.

S2: the length of a set of AM inserted corresponding to each logical channel is acquired according to the total length of the inserted AM.

The length of a correspondingly deleted IPG unit between the inserted two sets of AM corresponding to each logical channel is acquired according to the working rate of the physical link, the number of the distributed logical channels, the effective transmission rate corresponding to each logical channel, and the length of a set of AM inserted into each logical channel.

In a specific embodiment of the present invention, an AM insertion quantity register is allocated for each logical channel respectively.

An AM valid signal flag bit corresponding to each logical channel is monitored in real time.

The value of the corresponding insertion quantity register is incremented by one when the AM valid signal flag bit of the current logic channel indicates enabled.

The length of a set of AM inserted into each logical channel is equal to the total length of the AM inserted into the physical link at a fixed interval/the number of the logical channels distributed corresponding to one physical link.

In a preferred embodiment of the present invention, "acquiring the length of a correspondingly deleted IPG unit when a set of AM is inserted corresponding to each logical channel according to the working rate of the physical link, the number of the distributed logical channels, the effective transmission rate corresponding to each logical channel, and the length of a set of AM inserted into each logical channel" in step S2 specifically comprises the following steps.

The bearing rate corresponding to each logical channel is acquired according to the working rate of the physical link and the number of the distributed logical channels.

The bearing rate corresponding to each logical channel is equal to the working rate of the physical link/the number of the logical channels distributed corresponding to one physical link.

The length of the correspondingly deleted IPG unit between the inserted two sets of AM corresponding to each logical channel is acquired according to the effective transmission rate and the bearing rate corresponding to each logic channel, and the length of a set of AM inserted into each logical channel.

The length of the correspondingly deleted IPG unit when a set of AM is inserted corresponding to each logical channel is equal to the length of a set of AM inserted into each logical channel/(the bearing rate corresponding to each logical channel/the effective transmission rate corresponding to each logical channel).

For easy understanding, detailed description will be made below with specific examples.

Figure 3:
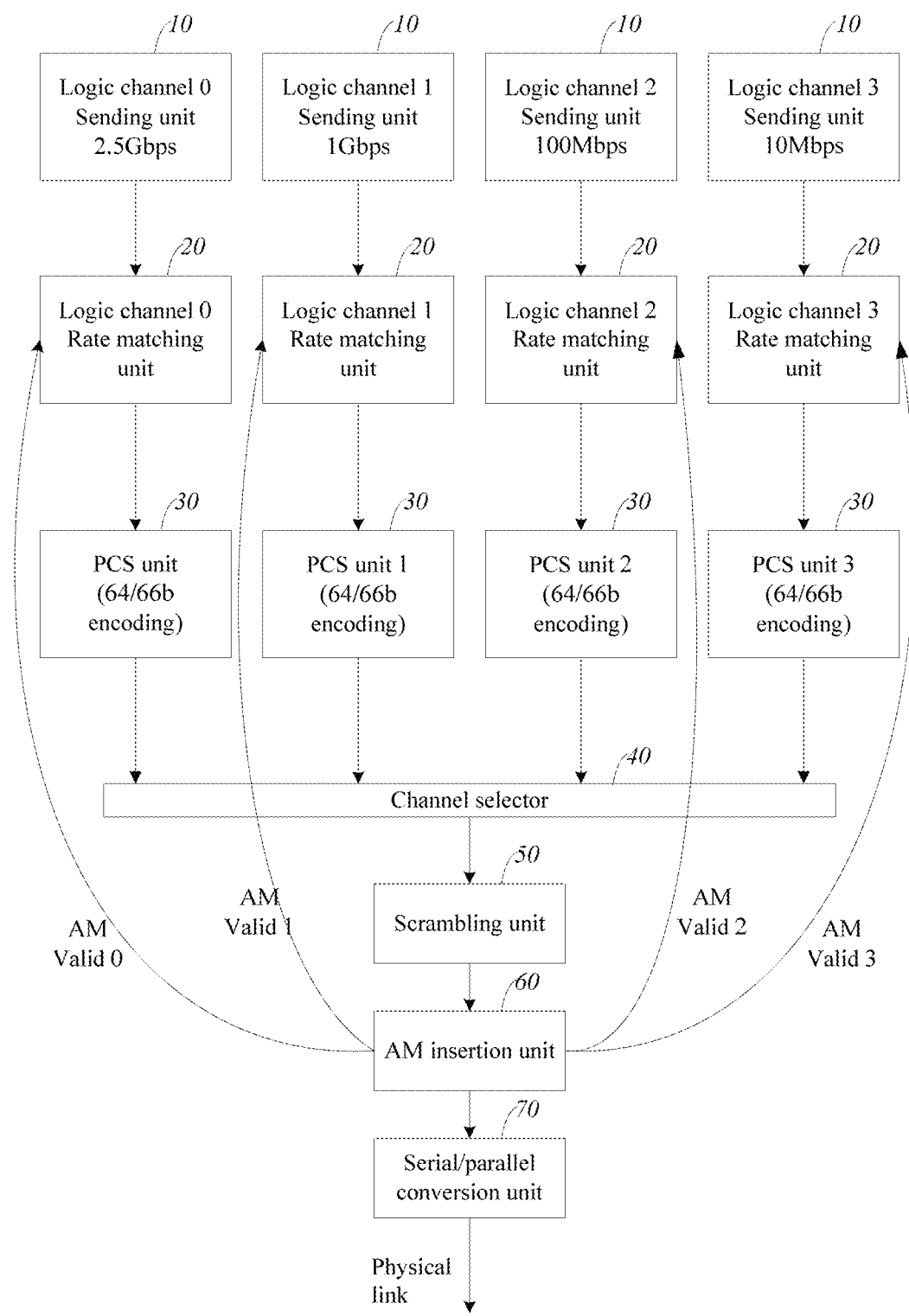
FIG. 3 is a structural diagram of integral implementation of a 10G-QXGMII mode of a specific example.

As shown in FIG. 3, the USXGMII-Multiport has multiple modes. The present invention uses the 10G-QXGMII mode defined in the protocol standard as an example to discuss the technical solution of the present invention. In such a mode, the working rate of one physical link is 10.3125G, which is simplified to 10G, 4 logical channels are distributed corresponding to the physical link, and the AM inserted into the physical link at a fixed interval is 4 pieces of 66-bit AM, that is, the total length of the AM is 4*8=32 bytes. The effective transmission rates corresponding to the four logical channels are: logical channel 0: 2.5G, logical channel 1: 1G, logical channel 2: 100M, and logical channel 3: 10M in sequence.

The AM valid signal flag bit and the AM insertion quantity register are set correspondingly on each logical channel. For any one logical channel, the AM valid signal flag bit usually has two states, an enabled state and a disenabled state. In the specific example, the binary number "0" indicates the disenabled state, and the binary number "1" indicates the enabled state. When the AM is inserted into the corresponding logical channel, the corresponding AM valid signal flag bit thereof will be changed from "0" to "1". When the rest of the data is transmitted on the corresponding logical channel, the clock of the corresponding AM valid signal flag bit remains the "0" state, which is not repeated in detail herein.

For any one logical channel, when the corresponding AM valid signal flag bit thereof indicates enabled, the value of the AM insertion quantity register is incremented by one.

In the example, the length of one set of AM inserted into each logical channel is equal to 32 bytes/4=8 bytes. The bearing rate corresponding to each logical channel is equal to 10G/4=2.5G. When one set of AM is inserted, for the logical channel 0, the length of the correspondingly deleted IPG unit thereof is 8 bytes/(2.5G/2.5G)=8 bytes. For logical channel 1, the length of the correspondingly deleted IPG unit thereof is 8 bytes/(2.5G/1G)=3.2 bytes. For logical channel 0, the length of the correspondingly deleted IPG unit thereof is 8 bytes/(2.5G/100M)=0.32 bytes. For the logical channel 0, the length of the correspondingly deleted IPG unit thereof is 8 bytes/(2.5G/10M)=0.032 bytes.

After the data enters the 10G-QXGMII framework, in a transmitting direction, corresponding to each logical channel, for the data received by a transmitting unit 10, since the effective transmission rate of the logical channel 0 is equal to the bearing rate, corresponding to the logical channel 0, the transmitted data is not required to be replicated, and the received data is directly forwarded by a rate matching unit 20 corresponding to the channel 0. For the data received by the logical channel 1, the logical channel 2, and the logical channel 3, since the effective transmission rate thereof is less than the bearing rate thereof, the data needs to be replicated in the rate matching unit 20 for rate matching and then forwarded. Further, after the data passing by the rate matching unit 20 enters a PCS unit 30 for 64/66 bit encoding operation, the data will be selected to the same physical link by a channel selector 40 alternatingly. Further, after the data of the four logical channels is selected onto one physical link, the data received from such single physical link will be scrambled in a scrambling unit 50, to ensure the signal transmission quality of signals on the physical link. After the data is subjected to the scrambling operation, four pieces of 66-bit AM are inserted in an AM insertion unit 60 every other fixed interval. After passing by the AM insertion unit 60, the data is converted from parallel data to serial data in a serial/parallel conversion unit 70 and is transmitted on the physical link.

During the insertion of the AM, the data being transmitted on the link will be stopped. Meanwhile, the AM insertion unit 60 transmits the insertion information to the rate matching unit 20, and the rate matching unit 20 changes the AM valid signal flag bit on the corresponding logical channel according to the position of the inserted AM, thereby adjusting the value of the AM insertion quantity register, and further acquiring the length of the correspondingly deleted IPG unit of each logical channel.

Further, the method further comprises the following step.

S3: the data deletion interval corresponding to each logical channel, and the length of the IPG data to be deleted between the data deletion intervals are acquired according to the length of the correspondingly deleted IPG unit of each logical channel and the number of the inserted AM.

In the specific implementation process of the present invention, the length of the obtained IPG unit may be an integer number of bytes, or may be a decimal number of bytes. Thus, in a preferred embodiment of the present invention, the step S3 specifically comprises the following steps.

Whether the length of the IPG unit corresponding to the current logical channel is an integer is judged.

If so, the length of the IPG unit is used as the length of the IPG data to be deleted corresponding to the current logical channel, and the data deletion interval is confirmed as 2 AM valid signals.

If not, the length of the IPG unit is rounded to $2^n$, the rounded result is used as the length of the IPG data to be deleted corresponding to the current logical channel, and the data deletion interval is confirmed as X AM valid signals, wherein X=$2^n$/the length of the IPG unit.

Further, in specific application of the present invention, the method further comprises: S4: uniformly deleting the IPG between data packets according to the length of the IPG data to be deleted corresponding to the current logic channel in the corresponding data deletion interval before data replication; and clearing the value of the data insertion quantity register corresponding to the current logical channel when the value of the current insertion quantity register is equal to the data deletion interval of the corresponding logical channel.

It should be noted that, in the specific implementation manner of the present invention, the IPG data with the corresponding length is not deleted at one step in the corresponding data deletion interval, but the IPG data with the corresponding length is uniformly deleted in the selected number of data quantity intervals, which is not repeated in detail herein.

Following the above example, for the logical channel 0, the length of the correspondingly deleted IPG unit is 8 bytes, which is an integer. Thus, the deleted IPG data length corresponding to the logical channel 0 is 8 bytes, and the corresponding data deletion interval is 2 AM valid signals. Correspondingly, before data replication, monitoring is performed to correspondingly delete the IPG data of 8 bytes between every two sets of AM inserted into the logical channel 0. Meanwhile, when the value of the current insertion quantity register is equal to the data deletion interval of the corresponding logical channel, the value of the data insertion quantity register corresponding to the current logical channel is cleared, to maintain the transmission rate of the current logical channel.

For the logical channel 1, the length of the correspondingly deleted IPG unit is 3.2 bytes, which is not an integer. Thus, the length of the IPG unit is rounded to $2^n$, and after being rounded, the result is $2^4$, namely 16 bytes. The deleted IPG data length corresponding to the logical channel 1 is 16 bytes, and the corresponding data deletion interval is 16/3.2=5 AM valid signals. Correspondingly, before data replication, monitoring is performed to correspondingly delete the IPG data of 16 bytes among every five sets of AM inserted into the logical channel 1. Meanwhile, when the value of the current insertion quantity register is equal to the data deletion interval of the corresponding logical channel, the value of the data insertion quantity register corresponding to the current logical channel is cleared, to maintain the transmission rate of the current logical channel.

For the logical channels 2 and 3, the implementation flow thereof is similar to that of the logical channel 1, and is not repeated in detail herein.

Figure 2:
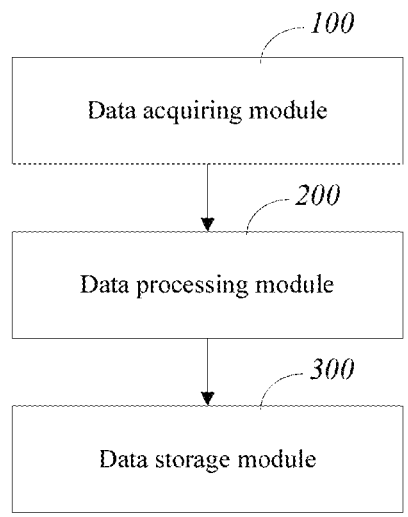
FIG. 2 is a modular schematic diagram of a system for accurate IPG compensation of USXGMII multi-channel in one embodiment of the present invention.

As shown in FIG. 2, in one embodiment of the present invention, a system for accurate IPG compensation of USXGMII multi-channel comprises: a data acquiring module 100, a data processing module 200 and a data storage module 300.

The data acquiring module 100 is configured to acquire the working rate of a physical link, the number of logical channels distributed corresponding to one physical link, and the effective transmission rate corresponding to each logical channel; and monitor the number of inserted AM corresponding to each logical channel, and monitor the total length of the AM inserted into the physical link at a fixed interval in real time during the data transmission process.

The data processing module 200 is configured to acquire the length of a set of AM inserted corresponding to each logical channel according to the total length of the inserted AM; and acquire the length of a correspondingly deleted IPG unit between the inserted two sets of AM corresponding to each logical channel according to the working rate of the physical link, the number of the distributed logical channels, the effective transmission rate corresponding to each logical channel, and the length of a set of AM inserted into each logical channel.

The data storage module 300 comprises: allocating an AM insertion quantity register for each logical channel respectively.

The data processing module 200 is specifically configured to monitor an AM valid signal flag bit corresponding to each logical channel in real time; and increment the value of the corresponding insertion quantity register by one when the AM valid signal flag bit of the current logic channel indicates enabled.

In a preferred embodiment of the present invention, the length of a set of AM inserted into each logical channel is equal to the total length of the AM inserted into the physical link at a fixed interval/the number of the logical channels distributed corresponding to one physical link.

Further, the data processing module 200 is specifically configured to acquire the bearing rate corresponding to each logical channel according to the working rate of the physical link and the number of the distributed logical channels; wherein the bearing rate corresponding to each logical channel is equal to the working rate of the physical link/the number of the logical channels distributed corresponding to one physical link; and acquire the length of the correspondingly deleted IPG unit between two sets of AM inserted corresponding to each logical channel according to the effective transmission rate and the bearing rate corresponding to each logic channel, and the length of a set of AM inserted into each logical channel; wherein the length of the correspondingly deleted IPG unit when a set of AM is inserted corresponding to each logical channel is equal to the length of a set of AM inserted into each logical channel/(the bearing rate corresponding to each logical channel/the effective transmission rate corresponding to each logical channel).

Further, the data processing module 200 is specifically configured to acquire the data deletion interval corresponding to each logical channel, and the length of the IPG data to be deleted between the data deletion intervals according to the length of the correspondingly deleted IPG unit of each logical channel and the number of the inserted AM.

In the specific implementation process of the present invention, the length of the obtained IPG unit may be an integer number of bytes, or may be a decimal number of bytes. Thus, in a preferred embodiment of the present invention, the data processing module 200 is specifically configured to judge whether the length of the IPG unit corresponding to the current logical channel is an integer, if so, use the length of the IPG unit as the length of the IPG data to be deleted corresponding to the current logical channel, and confirm the data deletion interval as 2 AM valid signals; and if not, round the length of the IPG unit to $2^n$, use the rounded result as the length of the IPG data to be deleted corresponding to the current logical channel, and confirm the data deletion interval as X AM valid signals, wherein X=$2^n$/the length of the IPG unit.

Further, the data processing module 200 is specifically configured to: uniformly delete the IPG between the data packets according to the length of the IPG data to be deleted corresponding to the current logic channel in the corresponding data deletion interval before data replication; and clear the value of the data insertion quantity register corresponding to the current logical channel when the value of the current insertion quantity register is equal to the data deletion interval of the corresponding logical channel.

It should be noted that, in the specific implementation manner of the present invention, the IPG data with the corresponding length is not deleted at one step in the corresponding data deletion interval, but the IPG data with the corresponding length is uniformly deleted in the selected number of data quantity intervals, which will is not repeated in detail here.

Those skilled in the art can clearly understand that for the convenience and brevity of the description, the specific working process of the system modules described above can refer to the corresponding process in the above method embodiment, which is not repeated in detail herein again.

In summary, according to the method and system for accurate IPG compensation of USXGMII multi-channel, according to the working rate of each logical channel, and the length of the inserted AM, the data deletion interval corresponding to the current logical channel and the length of the IPG data to be deleted are matched and acquired adaptively. Further, the data transmission rate is enabled to be precisely matched with the bearing rate of the logical channel, thereby meeting the performance requirements of the system, and improving the stability and reliability of a network chip.

For the convenience of description, the above device is divided into various modules by function for description. Of course, the functions of the various modules may be implemented in one or more software and/or hardware during implementation of the present invention.

The device embodiments described above are merely illustrative, wherein the modules described as separate components may or may not be physically separate, and the components displayed as modules may or may not be physical modules, i.e., may be located at one place, or may be distributed to multiple network modules. Some or all of the modules may be selected according to actual needs to achieve the purpose of the implementation solution, which can be understood and implemented by those ordinary skilled in the art without any creative effort.

It should be understood that, although the description is described in terms of the embodiments, each of the embodiments is not intended to contain an independent technical solution. Such description manner of the specification is merely intended for clarity. Those skilled in the art should take the specification as a whole, and the technical solutions in the respective embodiments may also be combined appropriately to form other embodiments that can be understood by those skilled in the art.

The series of detailed descriptions provided above are merely illustrative of the possible embodiments of the present invention, and are not intended to limit the protective scope of the present invention. The equivalent embodiments or alterations made without departing from the technology and spirit of the present invention should be included within the scope of the invention.

What is claimed is:

1. A method for accurate inter-packet-gap (IPG) compensation of USXGMII multi-channel, wherein the method comprises:
   acquiring a working rate of a physical link, a number of logical channels distributed corresponding to the physical link, and an effective transmission rate corresponding to each logical channel;
   monitoring a number of inserted alignment markers (AM) corresponding to each logical channel, and monitoring a total length of AM inserted into the physical link at a fixed interval in real time during a data transmission process;
   acquiring a length of a set of AM inserted corresponding to each logical channel according to the total length of the inserted AM;
   acquiring a length of a correspondingly deleted IPG unit between inserted two sets of AM corresponding to each logical channel according to the working rate of the physical link, the number of the distributed logical channels, the effective transmission rate corresponding to each logical channel, and the length of the set of AM inserted into each logical channel; and
   acquiring a data deletion interval corresponding to each logical channel, and a length of IPG data to be deleted between data deletion intervals according to the length of the correspondingly deleted IPG unit of each logical channel and the number of the inserted AM.

2. The method for accurate IPG compensation of USXGMII multi-channel according to claim 1, wherein "monitoring the number of the inserted AM corresponding to each logical channel in real time during the data transmission process" specifically comprises:
   allocating an AM insertion quantity register for each logical channel respectively;
   monitoring an AM valid signal flag bit corresponding to each logical channel in real time;
   incrementing a value of the AM insertion quantity register by one when the AM valid signal flag bit of a current logical channel is enabled; and
   clearing the value of the AM insertion quantity register corresponding to the current logical channel when the value of the AM insertion quantity register is equal to the data deletion interval of the corresponding logical channel.

3. The method for accurate IPG compensation of USXGMII multi-channel according to claim 1, wherein "monitoring the total length of the AM inserted into the physical link at the fixed interval in real time during the data transmission process, and acquiring the length of the set of AM inserted corresponding to each logical channel according to the total length of the inserted AM" specifically comprises that
   the length of the set of AM inserted into each logical channel is equal to the total length of the AM inserted into the physical link at the fixed interval/the number of the logical channels distributed corresponding to the physical link.

4. The method for accurate IPG compensation of USXGMII multi-channel according to claim 1, wherein "acquiring the length of the correspondingly deleted IPG unit between the inserted two sets of AM corresponding to each logical channel according to the working rate of the physical link, the number of the distributed logical channels, the effective transmission rate corresponding to each logical channel, and the length of the set of AM inserted into each logical channel" specifically comprises:

acquiring a bearing rate corresponding to each logical channel according to the working rate of the physical link and the number of the distributed logical channels, wherein the bearing rate corresponding to each logical channel is equal to the working rate of the physical link/the number of the logical channels distributed corresponding to the physical link; and acquiring the length of the correspondingly deleted IPG unit when the set of AM is inserted corresponding to each logical channel according to the effective transmission rate and the bearing rate corresponding to each logical channel, and the length of the set of AM inserted into each logical channel, wherein the length of the correspondingly deleted IPG unit when the set of AM is inserted corresponding to each logical channel is equal to the length of the set of AM inserted into each logical channel/(the bearing rate corresponding to each logical channel/the effective transmission rate corresponding to each logical channel).

5. The method for accurate IPG compensation of USXG-MII multi-channel according to claim 4, wherein "acquiring the data deletion interval corresponding to each logical channel, and the length of the IPG data to be deleted between the data deletion intervals according to the length of the correspondingly deleted IPG unit of each logical channel and the number of the inserted AM" specifically comprises:

judging whether a length of the IPG unit corresponding to the current logical channel is an integer, if so, using the length of the IPG unit as the length of the IPG data to be deleted corresponding to the current logical channel, and confirming the data deletion interval corresponding to the current logical channel as 2 AM valid signals; and if not, rounding the length of the IPG unit to $2^n$, using the rounded result as the length of the IPG data to be deleted corresponding to the current logical channel, and confirming the data deletion interval corresponding to the current logical channel as X AM valid signals, wherein $X=2^n$/the length of the IPG unit, and n is an integer.

6. A system for accurate IPG compensation of USXGMII multi-channel, wherein the system comprises: a data acquiring module, configured to:

acquire a working rate of a physical link, a number of logical channels distributed corresponding to the physical link, and an effective transmission rate corresponding to each logical channel; and monitor a number of inserted alignment markers (AM) corresponding to each logical channel, and monitor a total length of AM inserted into the physical link at a fixed interval in real time during a data transmission process;

a data processing module, configured to: acquire a length of a set of AM inserted corresponding to each logical channel according to the total length of the inserted AM;

acquire a length of a correspondingly deleted IPG unit when the set of AM is inserted corresponding to each logical channel according to the working rate of the physical link, the number of the distributed logical channels, the effective transmission rate corresponding to each logical channel, and the length of the set of AM inserted into each logical channel; and acquire a data deletion interval corresponding to each logical channel, and a length of IPG data to be deleted between data deletion intervals according to the length of the correspondingly deleted IPG unit of each logical channel and the number of the inserted AM.

7. The system for accurate IPG compensation of USXG-MII multi-channel according to claim 6, further comprising a data storage module, wherein the data storage module comprises: an AM insertion quantity register allocated for each logical channel respectively; and the data processing module is further configured to:
monitor an AM valid signal flag bit corresponding to each logical channel in real time;

increment a value of the AM insertion quantity register by one when the AM valid signal flag bit of a current logical channel is enabled; and clear the value of the data insertion quantity register corresponding to the current logical channel when the value of the current insertion quantity register is equal to the data deletion interval of the corresponding logical channel.

8. The system for accurate IPG compensation of USXG-MII multi-channel according to claim 6, wherein the data processing module is specifically configured such that the length of the set of AM inserted into each logical channel is equal to the total length of the AM inserted into the physical link at the fixed interval/the number of the logical channels distributed corresponding to the physical link.

9. The system for accurate IPG compensation of USXG-MII multi-channel according to claim 6, wherein the data processing module is specifically configured to:

acquire a bearing rate corresponding to each logical channel according to the working rate of the physical link and the number of the distributed logical channels, wherein the bearing rate corresponding to each logical channel is equal to the working rate of the physical link/the number of the logical channels distributed corresponding to the physical link; and acquire the length of the correspondingly deleted IPG unit when the set of AM is inserted corresponding to each logical channel according to the effective transmission rate and the bearing rate corresponding to each logical channel, and the length of the set of AM inserted into each logical channel, wherein the length of the correspondingly deleted IPG unit when the set of AM is inserted corresponding to each logical channel is equal to the length of the set of AM inserted into each logical channel/(the bearing rate corresponding to each logical channel/the effective transmission rate corresponding to each logical channel).

10. The system for accurate IPG compensation of USXG-MII multi-channel according to claim 9, wherein the data processing module is specifically configured to:

judge whether a length of the IPG unit corresponding to the current logical channel is an integer, if so, use the length of the IPG unit as the length of the IPG data to be deleted corresponding to the current logical channel, and confirm the data deletion interval corresponding to the current logical channel as 2 AM valid signals; and if not, round the length of the IPG unit to $2^n$, use the rounded result as the length of the IPG data to be deleted corresponding to the current logical channel, and confirm the data deletion interval corresponding to the current logical channel as X AM valid signals, wherein X=$2^n$/the length of the IPG unit, and n is an integer.

11. The method for accurate IPG compensation of USXG-MII multi-channel according to claim 3, wherein "acquiring the length of the correspondingly deleted IPG unit between the inserted two sets of AM corresponding to each logical channel according to the working rate of the physical link, the number of the distributed logical channels, the effective transmission rate corresponding to each logical channel, and the length of the set of AM inserted into each logical channel" specifically comprises:
acquiring a bearing rate corresponding to each logical channel according to the working rate of the physical link and the number of the distributed logical channels, wherein the bearing rate corresponding to each logical channel is equal to the working rate of the physical link/the number of the logical channels distributed corresponding to the physical link; and
acquiring the length of the correspondingly deleted IPG unit when the set of AM is inserted corresponding to each logical channel according to the effective transmission rate and the bearing rate corresponding to each logical channel, and the length of the set of AM inserted into each logical channel, wherein the length of the correspondingly deleted IPG unit when the set of AM is inserted corresponding to each logical channel is equal to the length of the set of AM inserted into each logical channel/(the bearing rate corresponding to each logical channel/the effective transmission rate corresponding to each logical channel).

12. The method for accurate IPG compensation of USXG-MII multi-channel according to claim 11, wherein "acquiring the data deletion interval corresponding to each logical channel, and the length of the IPG data to be deleted between the data deletion intervals according to the length of the correspondingly deleted IPG unit of each logical channel and the number of the inserted AM" specifically comprises:
judging whether a length of the IPG unit corresponding to the current logical channel is an integer,
if so, using the length of the IPG unit as the length of the IPG data to be deleted corresponding to the current logical channel, and confirming the data deletion interval corresponding to the current logical channel as 2 AM valid signals; and
if not, rounding the length of the IPG unit to $2^n$, using the rounded result as the length of the IPG data to be deleted corresponding to the current logical channel, and confirming the data deletion interval corresponding to the current logical channel as X AM valid signals, wherein X=$2^n$/the length of the IPG unit, and n is an integer.

13. The system for accurate IPG compensation of USXG-MII multi-channel according to claim 8, wherein the data processing module is specifically configured to:
acquire a bearing rate corresponding to each logical channel according to the working rate of the physical link and the number of the distributed logical channels, wherein the bearing rate corresponding to each logical channel is equal to the working rate of the physical link/the number of the logical channels distributed corresponding to the physical link; and
acquire the length of the correspondingly deleted IPG unit when the set of AM is inserted corresponding to each logical channel according to the effective transmission rate and the bearing rate corresponding to each logical channel, and the length of the set of AM inserted into each logical channel, wherein the length of the correspondingly deleted IPG unit when the set of AM is inserted corresponding to each logical channel is equal to the length of the set of AM inserted into each logical channel/(the bearing rate corresponding to each logical channel/the effective transmission rate corresponding to each logical channel).

14. The system for accurate IPG compensation of USXG-MII multi-channel according to claim 13, wherein the data processing module is specifically configured to:
judge whether a length of the IPG unit corresponding to the current logical channel is an integer,
if so, use the length of the IPG unit as the length of the IPG data to be deleted corresponding to the current logical channel, and confirm the data deletion interval corresponding to the current logical channel as 2 AM valid signals; and
if not, round the length of the IPG unit to $2^n$, use the rounded result as the length of the IPG data to be deleted corresponding to the current logical channel, and confirm the data deletion interval corresponding to the current logical channel as X AM valid signals, wherein X=$2^n$/the length of the IPG unit, and n is an integer.

* * * * *